United States Patent Office 3,099,686
Patented July 30, 1963

3,099,686
DECARBOXYLATION OF AROMATIC ACIDS
Willis C. Keith, Lansing, Joseph A. Verdol, Dolton, and Robert P. Zmitrovis, Park Forest, Ill., assignors, by mesne assignments, to Sinclair Research, Inc., New York, N.Y., a corporation of Delaware
No Drawing. Filed Mar. 6, 1959, Ser. No. 797,575
12 Claims. (Cl. 260—521)

This invention is drawn to a new and useful method for the production of phenolates and hydroxy benzenes by the decarboxylation of substituted benzoic and other aromatic acids which have at least one carboxyl group ortho or para to a halogen or sulfonic acid group. The process may be indicated generally by the equation

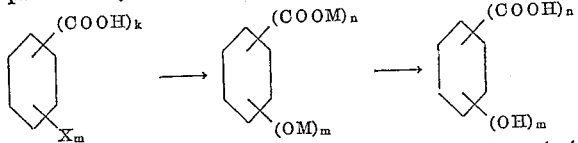

where $k$ is a number from 2–5, $m$ is a number from 1–4, $n$ is a number from 0 to 4, and is at least one less than $k$, X is a halogen (fluorine, chlorine, bromine or iodine) or sulfonic acid group, and M represents an alkaline metal such as an alkali metal, or half an alkaline earth metal, i.e. with an alkaline earth metal the remaining valence could be occupied by a hydroxy group to give a "basic" salt or the metal might link two benzene molecules.

The invention comprises reacting the ring-substituted acid with a basic acting material at an elevated temperature in the presence of water to produce an alkaline phenolate which may then be converted to the hydroxy benzene. In the reaction at least one carboxyl group which is ortho and/or para to an X substituent is broken from the ring (decarboxylated) while a carboxyl group only meta to an X substituent may not be. Some starting materials and products are illustrated by the following:

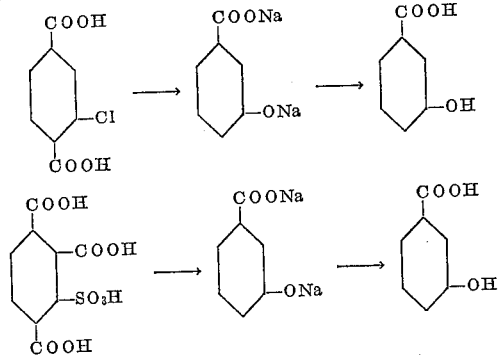

Preferably $m$ is 1 to 2 and $n$ is 1 to 3. The process is effective on compounds such as 3-chloro-o-phthalic acid; 2-sulfo-m-phthalic acid; 1,2,4-tri-carboxy-3-chlorobenzene; 2,5-dichloroterephthalic acid; tetrachloro terephthalic acid; dibromopyromellitic acid, etc.

The polyfunctional materials produced by the process of the invention have many uses. Salicylic acid, of course, is valuable for the manufacture of aspirin. Other hydroxy benzoic acids so produced are excellent starting materials for polyester and alkyd resins which find use as synthetic fibers and paint bases and viscosity improvers for lubricant compositions. Polymerization using these compounds is greatly simplified since the polyesters so manufactured are homopolymers when these starting materials are used. Hydroxy phthalic acid and other hydroxy polycarboxylic acids are convertible to polyester resins having a built-in dye site.

Prior art methods for preparing hydroxy carboxylated benzenes are not numerous and usually involve building up the substituents on the benzene ring by means of a very complex series of reactions. The process of this invention is applicable to intermediates which can be manufactured from petroleum hydrocarbons by means which are relatively simple and known to the art. For example, durene recovered from petroleum can be converted by oxidation to pyromellitic acid and then halogenated or sulfonated. Chloro or sulfo phthalic acid used as a starting material in the process of this invention may be easily and cheaply prepared from xylene.

In a particular aspect this invention is concerned with the production of mono- and di-hydroxy benzoic acids, but aromatic compounds in general which contain two or more carboxylic acid groups and one or more halogen or sulfonic acid substituents are suitable feeds for this reaction. The compound may contain both halogen and sulfonic acid groups. The process is effective to produce phenol from a feed such as 4-chloro-isophthalic acid, but is particularly directed to the production of the more valuable polyfunctional phenolates and hydroxy benzenes, such as metahydroxy benzoic acid, i.e. where the product has at least one carboxyl group (or its metal salt) and at least one hydroxy group (or its metal form). Thus the preferred feedstock has at least one sulfonic acid or halogen substituent only meta to the carboxyl groups.

The process of the invention comprises reacting the ring-substituted acid with a basic-acting material or basic aqueous medium at an elevated temperature of at least about 185° C. in the presence of water to produce the salt. The salt may be recovered as such or may be converted to the acid by conventional means, e.g. acidification with a strong mineral acid. The pressure is sufficient to maintain the liquid phase and generally the conversion to the salt will be essentially complete in about 5 seconds to 10 hours.

As least about an equal molar quantity, usually about 1–10 moles, of basic-acting material is used for each halogen, sulfonic acid and carboxylic constituent on the ring. The basic-acting material may be any commonly used inorganic basic substance such as the alkaline hydroxides, including the alkali metal hydroxides and alkaline earth metal hydroxides, and salts of these hydroxides with weak acids. Since the reaction which takes place below about 200° C. gives only slight conversion to the salt, a temperature range of about 225–350° C. is preferred. Temperatures to just below degradation of the reactants or products can be employed. About 2–5 moles of sodium hydroxide in an aqueous solution are reacted with the aromatic starting material for about 1 to 7 hours in a preferred performance of the process.

The amount of water used is not critical and its quantity is determined by the recovery problems associated with the particular salt produced. Although a solution of the basic material is preferred, the water of hydration present in commercial caustic soda, for example, or the moisture in the air may be sufficient to provide the necessary water. In any event the amount of water is sufficient to give the desired result.

Acidification of the salt may be performed by contacting the salt, e.g. at ambient or other temperature with a solution of a mineral or strong organic acid. Hydrochloric, sulfuric, acetic acids, etc. are suitable.

The following examples are to be considered as illustrative only and not limiting.

*Example I*

150 ml. of a 15% sodium hydroxide solution and 4 grams of 2-chloroterephthalic acid were charged to a 300 ml. Aminco shaker bomb. The bomb was sealed and then heated rapidly to 325° C. at which temperature it was maintained (±10° C.) for 5 hours. After cooling to about 20° C. the bomb contents were removed. Acidification of the solution with HCl resulted in the precipitation of unreacted 2-chloroterephthalic acid which was washed with water and dried at 130° C. for three hours. The filtrate, containing m-hydroxy benzoic acid was extracted with ether. Following the removal of ether on a steam bath, the white crystalline residue was weighed and recrystallized from a mixture of benzene and isopropyl acetate. The product showed a conversion of 54% of the 2-chloroterephthalic acid to m-hydroxy benzoic acid, melting at 204° C.

*Example II*

The same quantities of 2-chloroterephthalic acid and basic-acting reagent as in Example I were charged to the bomb and heated to 250° C. for three hours. Working up as in Example I showed a 50.7% conversion to m-hydroxy benzoic acid and a 40.8% recovery of starting material.

*Example III*

The reaction was conducted exactly as in Example I except that the temperature was 200° C. Only a slight conversion took place and 93.8% of the starting 2-chloroterephthalic acid was recovered.

*Example IV*

The procedure of Example I was again followed, using a temperature of 175° C. No reaction took place, and 100% of the starting material was recovered.

*Example V*

Six grams of 2-sulfoterephthalic acid were charged to the bomb with 150 ml. of 10% NaOH aqueous solution. A temperature in the range 315–335° C. was maintained for six hours. Subsequent working up, including recrystallization from a mixture of acetone and carbon tetrachloride, showed an 82% conversion to m-hydroxy benzoic acid.

*Example VI*

The materials of Example V, were reacted for six hours at about 200° C. in the bomb. Only a small amount of the 2-sulfoterephthalic acid was converted and 92% of the starting material was recovered.

*Example VII*

3 grams of 2,5-di-chloroterephthalic acid were reacted with 150 ml. of a 15% aqueous NaOH solution in a shaker bomb. The reaction mixture was held at a temperature of 315–335° C. for five hours. 53 percent of the starting material was converted by acidification to 2,5-dihydroxybenzoic acid (M.P. 199–200° C.).

*Example VIII*

4 grams of 4-chloroisophthalic acid was reacted with 100 ml. of aqueous (10%) NaOH in a shaker bomb for 5½ hours at 282 to 296° C. The reaction product was acidified with HCl with the evolution of $CO_2$. The product was extracted with ether to give about 2 grams of phenol.

It is clear from these examples that the process of this invention provides a simple method for production of phenolates and hydroxy aromatic acids from relatively easily obtainable starting materials.

We claim:

1. A method for the production of salts of the formula

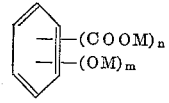

where $m$ is a number from 1 to 4, $n$ is a number from 0 to 4 and M is a metal selected from the group consisting of alkali and alkaline earth metals which comprises reacting at a temperature of about 185° C. to 350° C. and in the liquid phase a reaction mixture consisting essentially of an aromatic acid of the formula

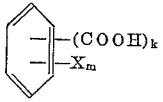

where $k$ is a number from 2 to 5 and is at least one more than $n$ and X is selected from the group consisting of halogen and sulfonic acid radicals, at least one of which is ortho or para to a carboxyl radical, water and an inorganic basic compound of said metal in a molar quantity at least about equal to $k+m$.

2. The method of claim 1 in which $n$ is a number from 1 to 4.

3. The process of claim 2 where M is an alkali metal.

4. The process of claim 3 where the alkali metal is sodium.

5. The process of claim 2 wherein the temperature is about 225 to 350° C.

6. The process of claim 2 wherein the mole quantity is about 2–5 times $k+m$.

7. The process of claim 2 where X is chlorine.

8. The process of claim 2 where X is a sulfonic acid radical.

9. The process of claim 2 where M is sodium, X is chlorine and $n$ is 1.

10. The process of claim 2 where M is sodium, X is a sulfonic acid radical and $n$ is 1.

11. The process of claim 2 which also comprises the step of acidifying the salt to an acid.

12. The process of claim 2 where the aromatic acid is terephthalic acid having the X substitutent in the 2-position.

References Cited in the file of this patent

UNITED STATES PATENTS

| 1,962,175 | Daudt | June 12, 1934 |
| 2,063,365 | Conover | Dec. 8, 1936 |

FOREIGN PATENTS

| 747,942 | Great Britain | Apr. 18, 1956 |

OTHER REFERENCES

Fieser et al.: Organic Chemistry, page 631 (1950).
Fieser et al.: Organic Chemistry, page 665 (1950).
Royals: Advanced Organic Chemistry, page 108 (1954).